United States Patent [19]
Martinitz et al.

[11] Patent Number: 5,732,826
[45] Date of Patent: Mar. 31, 1998

[54] CONVEYOR FOR LIQUID MEDIA WITH PRODUCTION RESIDUES

[75] Inventors: Hans-Peter Martinitz, Kuchen; Klaus Santler, Esslingen-Weil, both of Germany

[73] Assignee: F & F Filter- Und Fordertechnik GmbH, Ostfildern, Germany

[21] Appl. No.: 511,235

[22] Filed: Aug. 4, 1995

[30] Foreign Application Priority Data

Oct. 8, 1994 [DE] Germany ............... 44 36 002.9

[51] Int. Cl.⁶ .................................. B07B 1/04
[52] U.S. Cl. .................. 209/247; 209/265; 209/268
[58] Field of Search .................. 209/247, 254, 209/265, 266, 268, 358, 352

[56] References Cited

U.S. PATENT DOCUMENTS

| | | | |
|---|---|---|---|
| 145,314 | 12/1873 | Thielen | 209/265 |
| 2,053,038 | 9/1936 | Mackenzie | 209/358 X |
| 2,317,430 | 4/1943 | Ayers et al. | 209/268 |
| 4,177,900 | 12/1979 | Kluthe | 209/247 |
| 4,472,272 | 9/1984 | Capannoli | 209/268 |
| 4,608,156 | 8/1986 | Reddish, Jr. | 209/358 X |
| 5,431,287 | 7/1995 | Knox | 209/254 X |

*Primary Examiner*—D. Glenn Dayoan
*Attorney, Agent, or Firm*—Evenson McKeown Edwards & Lenahan, PLLC

[57] ABSTRACT

A conveyor is provided for liquid media, such as cooling-lubricating liquids containing production residues, such as machinery chips. The conveyance takes place along a gutter via a driven scraper conveyor extending into it and extending along its linear direction and under the effects of a downslope of the bottom of the gutter. A separation of large-grained production residue from the liquid media containing fine-grained production residue is achieved already in the course of their conveyance in the gutter. This separation is made possible in that the gutter is divided into an upper and lower area via a perforated divider bottom extending along the length thereof and spaced apart from the gutter bottom. The lower area is a flushing channel to receive liquid media containing fine-grained production residue. An upper conveyor run of the scraper conveyor is conducted along the top of the perforated divider bottom, which the large-grained production residue can be conveyed along the top of the perforated bottom and its top can be cleaned.

19 Claims, 1 Drawing Sheet

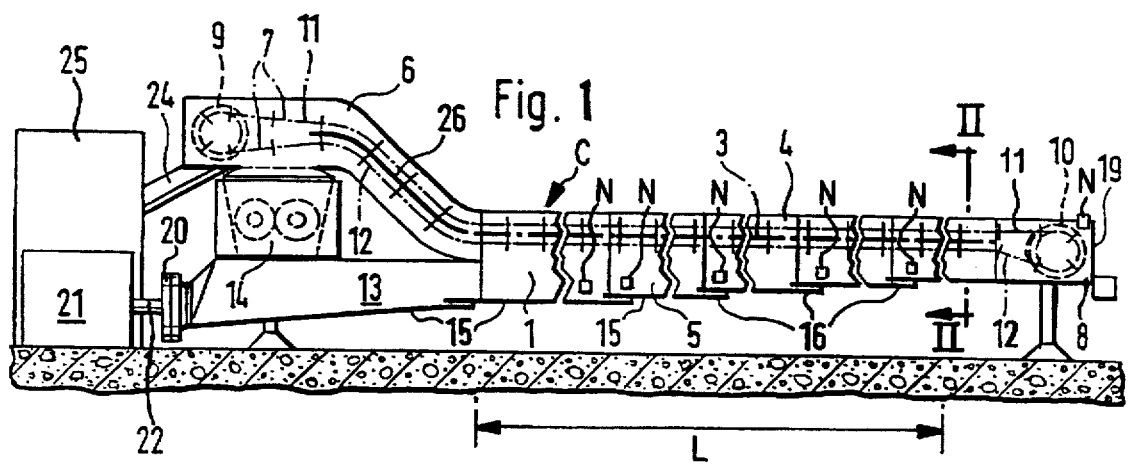
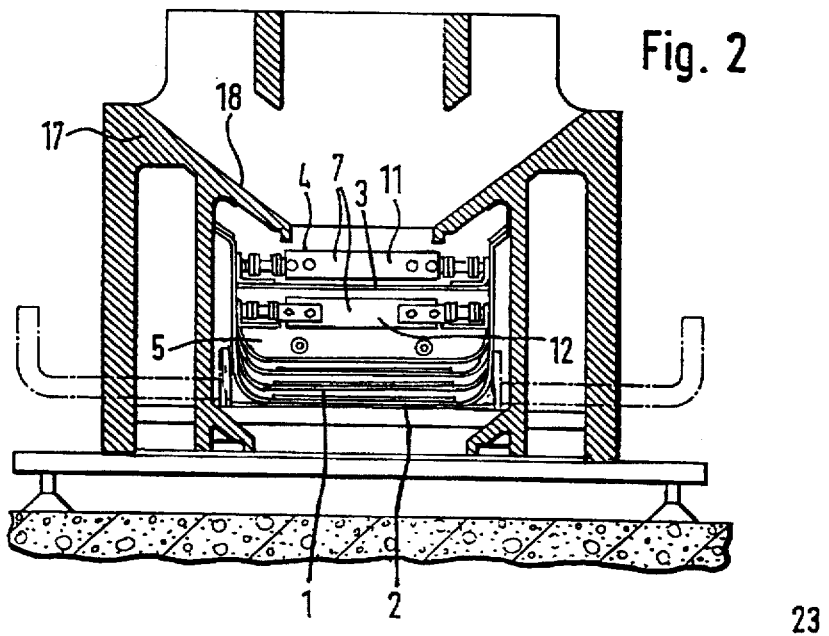
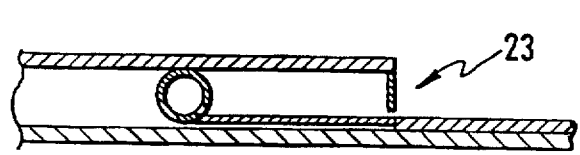
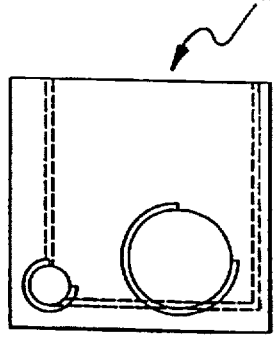

CONVEYOR FOR LIQUID MEDIA WITH PRODUCTION RESIDUES

BACKGROUND AND SUMMARY OF THE INVENTION

The invention relates to a conveyor for liquid media, such as cooling-lubricating liquids, with production residues, such as chips, wherein the conveyance takes place along a gutter by means of a driven scraper conveyor extending into it and extending along its linear direction, and under the effects of a downslope of the bottom of the gutter.

In connection with a conveyor of this type known from actual use, fine- and large-grained production residue is conveyed in the gutter by means of the scraper conveyor, whose lower belt enters the gutter from above. It is particularly disadvantageous in connection with this conveyor that the fine- and rough-grained production residue cannot be separated, so that the latter can result in obstructions to the conveyance in the gutter.

It is an object of the invention to achieve a separation of the large-grained production residue from the liquid media containing only fine-grained production residue in the gutter, already in the course of their conveyance, to thereby reduce the danger of obstacles to the conveyance by means of this separation and also to make possible a separate removal or treatment of large-grained production residue.

This object is attained with a conveyor of the type mentioned at the outset in preferred embodiments of the invention by providing that the gutter is divided into an upper and lower area or region by means of a perforated divider bottom extending along the length thereof and spaced apart from the gutter bottom. The gutter bottom which is configured as a flushing channel to receive liquid media containing fine-grained production residue. The upper area accommodates an upper conveyor chain or belt run of the scraper conveyor to move along the top of the perforated divider bottom, by means of which the large-grained production residue is conveyed along the top of the perforated divider bottom and its top can be cleaned.

In the process and apparatus according to the invention, only liquid media containing fine-grained production residue reaches the lower area of the gutter, while the large-grained production residue remains in the upper area of the gutter and can be conveyed there separately. In the process, the liquid media containing fine- and large-grained production residue can be placed from above on the conveyor either only at one place according to certain contemplated preferred embodiments or at several places distributed over the length of the conveyor according to other contemplated preferred embodiments.

The perforated bottom of the conveyor is advantageously embodied as a bar screen bottom in preferred embodiments of the invention. The further conveyance of the liquid media with the fine-grained production residue is made possible in a simple manner in that the end section on the discharge side of the lower area of the gutter terminates in a connector for a pipe line leading to a return reservoir.

The conveyance of the liquid media with the fine-grained production residue can be improved and accelerated according to certain preferred embodiments of the invention in that flushing nozzles are arranged in the lower part of the gutter. The flushing nozzles are disposed separated from each other near the bottom of the gutter, wherein liquid media are supplied through the flushing nozzles and their spray effect is used.

In connection with the conveyors constructed in accordance with the invention, there are several options for the further treatment of the large-sized production residue conveyed in the upper area of the gutter.

A first arrangement of embodiments are contemplated where the upper area of the gutter with the upper belt run of the scraper conveyor guided therein terminates in a collection container for large-grained production residue, by means of which an arbitrary (selective) further processing of the large-grained production residue is made possible.

According to further contemplated preferred embodiments, the upper area of the gutter with the upper belt of the scraper conveyor guide therein terminates in a comminuting device for large-grained production residue, by means of which the immediate comminution of the large-grained production residue is achieved.

Finally, other embodiments are contemplated wherein a collection of all production residue in the end area of the conveyor is achieved in that the upper area of the gutter with the upper belt of the scraper conveyor guided therein has an upwardly extending end section terminating over the end section of the lower area, and in that a comminuting device for large-grained production residue is disposed between the end sections of both areas. The comminuting device is supplied with large-grained production residue by the scraper conveyor. Comminuted production residue processed in the comminuting device is transferred to the end section of the lower area of the conveyor.

Preferred embodiments of the invention are advantageously used with machine tools, such as lathes, to facilitate recirculation of lubricant and/or cooling liquid media which collects production residue, such as machinery chips, during operation of the machine tool.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic vertical center sectional view in the longitudinal direction of a conveyor constructed according to a preferred embodiment of the invention;

FIG. 2 is a schematic cross sectional view of the conveyor taken along Section II—II of FIG. 1, with the additional representation of a machine base and showing an inlet liquid media with machine production residues, FIG. 3 is a lateral partial view which shows flushing nozzles constructed according to a preferred embodiment of the present invention;

FIG. 4 is a top view of the flushing nozzle section shown in FIG. 3.

DETAILED DESCRIPTION OF THE DRAWINGS

A gutter 1 is formed in a frame 2 extending in a linear direction of a conveyor C. The gutter 1 is divided into an upper area 4 and a lower area 5 by a bar screen bottom 3 extending in the linear travel direction of the conveyor. The upper area 4 has an upwardly extending end section 6, which is adjoined by a correspondingly upward-extending sheet metal plate on the bar screen bottom 3. A scraper conveyor 7 extends over the entire length of the conveyor, which scraper conveyor 7 is guided and driven via chain wheels 9, 10 located respectively in the upwardly extending end section 6 and the opposite end section 8. In the illustrated embodiment, chains carry the scrapers of the conveyor 7. The upper or top chain run 11 (conveying run) of the scraper conveyor 7 is guided along the top of the bar screen bottom 3, while the lower or bottom run 12 of the scraper conveyor. 7 extends below the bar screen bottom 3. Embodiments with belt drives for the conveyor scrapers of the conveyor are also contemplated.

A comminuting device 14 is disposed between the upwardly extending end section 6 of the upper area 4 of the gutter 1 and the end section 13 of the lower area 5 of the gutter 1 extending below it, into which large-grained impurities are thrown from the upwardly extending end of the scraper conveyor 7. The impurities comminuted by the comminuting device 14 fall into the end section 13 of the lower area 5 of the gutter 1. The end section 13 has a connector 20 for a pipe line.

The bottom 15 of the gutter 1 is downwardly stepped several times in the direction of conveyance, in FIG. 1 from the right to the left. Flushing nozzles N directed in the direction of conveyance, are disposed in each step 16 and in the end wall 19 of the end section 8.

A machine base 17, extending transversely across the conveyor, has guide surface 18 inclined toward the scraper conveyor 7, over which liquid media containing impurities leaving a machine, not represented in the drawings, flow into the bar screen bottom 3. In contemplated preferred embodiments, the liquid media is lubricant/coolant for a machine tool, more specifically a cutting tool or lathe which in use creates chips which are entrained in the liquid media lubricant coolant. This conveyor of the present invention can be used in conjunction with and upstream of a fluid processing system disclosed in commonly owned German Application P 44 36 003.7, filed in Germany on Oct. 8, 1994, and a corresponding U.S. application based thereon.

A pipe line 22 leading to a return reservoir 21 is connected with the connector 20.

If a comminuting device 14 is not provided, large-grained production residue can be transferred by means of a chute 24 into a collection container 25 for large-grained production residue.

In the upwardly extending end section 6 of the gutter 1, the bar screen bottom 3 has been replaced by a sheet metal plate 26 adjoining it, via which the large-grained production residue can be conveyed upward.

In preferred embodiments of the invention, the perforated divider screen bottom extends over the entire length "L" between the residue inlet location at Section II—II to immediately adjacent the upwardly extending end Section 6. Other embodiments are contemplated where the perforated divider bottom extends over a substantial portion of length "L", preferably at least one-half of this total length "L".

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A conveyor for liquid media, such as cooling-lubricating liquids with production residues, such as chips, wherein the conveyance takes place along a gutter by means of a driven scraper conveyor extending into the gutter and extending along a gutter linear direction and under the effects of a downslope of the bottom of the gutter, wherein the gutter is divided by means of a perforated divider bottom extending along a length of the gutter and spaced apart from a gutter bottom, into a lower area and an upper area, wherein the lower area is configured as a flushing channel to receive liquid media containing fine-grained production residue, wherein an upper run of the scraper conveyor is conducted along a top of the perforated bottom, such that large-grained production residue is conveyed along the top of the perforated divider bottom and its top can be cleaned, and wherein an end section on a discharge side of the lower area of the gutter terminates in a connection for a pipe line leading to a return reservoir.

2. A conveyor in accordance with claim 1, wherein the perforated divider bottom is a bar screen bottom.

3. A conveyor in accordance with claim 1, wherein flushing nozzles are disposed in the lower area of the gutter spaced apart along the gutter length near the bottom of the gutter.

4. A conveyor in accordance with claim 1 wherein the upper area of the gutter with an upper run of the scraper conveyor guided therein terminates in a collection container for large-grained production residue.

5. A conveyor in accordance with claim 1, wherein the upper run of the gutter with the upper belt of the scraper conveyor guided therein terminates in a comminuting device for large-grained production residue.

6. A conveyor in accordance with claim 1, wherein the upper area of the gutter with an upper run of the scraper conveyor guided therein has an upwardly extending end section terminating over an end section of the lower area, and wherein a comminuting device for large-grained production residue is disposed between the end sections of both the upper and lower areas, which comminuting device is supplied with large-grained production residue by the scraper conveyor and from which comminuted production residue can be transferred to the end section of the lower area of the gutter.

7. A conveyor in accordance with claim 4, wherein the perforated divider bottom is a bar screen bottom.

8. A conveyor in accordance with claim 3, wherein the perforated divider bottom is a bar screen bottom.

9. A conveyor in accordance with claim 5, wherein the perforated divider bottom is a bar screen bottom.

10. A conveyor in accordance with claim 9, wherein the upper area of the gutter with an upper run of the scraper conveyor guided therein terminates in a collection container for large-grained production residue.

11. A conveyor in accordance with claim 3, wherein the upper run of the gutter with the upper belt of the scraper conveyor guided therein terminates in a comminuting device for large-grained production residue.

12. A conveyor in accordance with claim 2, wherein the upper area of the gutter with an upper run of the scraper conveyor guided therein has an upwardly extending end section terminating over an end section of the lower area, and wherein a comminuting device for large-grained production residue is disposed between the end sections of both the upper and lower areas, which comminuting device is supplied with large-grained production residue by the scraper conveyor and from which comminuted production residue can be transferred to the end section of the lower area of the gutter.

13. A conveyor for liquid media, such as cooling-lubricating liquids with production residues, such as chips, wherein the conveyance takes place along a gutter by means of a driven scraper conveyor extending into the gutter and extending along a gutter linear direction and under the effects of a downslope of the bottom of the gutter, wherein the gutter is divided by means of a perforated divider bottom extending along a length of the gutter and spaced apart from a gutter bottom, into a lower area and an upper area, wherein the lower area is configured as a flushing channel to receive liquid media containing fine-grained production residue, wherein an upper run of the scraper conveyor is conducted along a top of the perforated bottom, such that large-grained production residue is conveyed along the top of the perforated divider bottom and its top can be cleaned, wherein the upper area of the gutter with an upper run of the scraper conveyor guided therein has an upwardly extending end section terminating over an end section of the lower area, and wherein a comminuting device for large-grained production residue is disposed between the end sections of both the upper and lower areas, which comminuting device is supplied with large-grained production residue by the scraper conveyor and from which comminuted production residue can be transferred to the end section of the lower area of the gutter.

14. A conveyor according to claim 13, wherein the perforated divider bottom is a bar screen bottom.

15. A conveyor according to claim 13, wherein flushing nozzles are disposed in the lower area of the gutter spaced apart along the gutter length near the bottom of the gutter.

16. A conveyor according to claim 13, wherein the upper area of the gutter with an upper run of the scraper conveyor guided therein terminates in a collection container for large-grained production residue.

17. A conveyor according to claim 13, wherein the upper run of the gutter with the upper belt of the scraper conveyor guided therein terminates in a comminuting device for large-grained production residue.

18. A conveyor according to claim 14, wherein flushing nozzles are disposed in the lower area of the gutter spaced apart along the gutter length near the bottom of the gutter.

19. A conveyor according to claim 18, wherein the upper run of the gutter with the upper belt of the scraper conveyor guided therein terminates in a comminuting device for large-grained production residue.

* * * * *